US012614865B2

(12) United States Patent
Mastel

(10) Patent No.: US 12,614,865 B2
(45) Date of Patent: Apr. 28, 2026

(54) PLUG CONNECTOR AND INSULATING HOUSING FOR A PLUG CONNECTOR

(71) Applicant: WAGO Verwaltungsgesellschaft mbH, Minden (DE)

(72) Inventor: Rudolf Mastel, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 315 days.

(21) Appl. No.: 18/369,618

(22) Filed: Sep. 18, 2023

(65) Prior Publication Data

US 2024/0097355 A1 Mar. 21, 2024

(30) Foreign Application Priority Data

Sep. 19, 2022 (DE) ..................... 20 2022 105 275.1

(51) Int. Cl.
*H01R 4/48* (2006.01)

(52) U.S. Cl.
CPC ........... *H01R 4/483* (2023.08); *H01R 4/4844* (2023.08)

(58) Field of Classification Search
CPC ......... H01R 4/483; H01R 4/4844; H01R 4/48
USPC ........................................... 439/78, 660, 729
See application file for complete search history.

(56) References Cited

U.S. PATENT DOCUMENTS 10,014,596 B2 7/2018 Hartmann
2011/0207372 A1* 8/2011 Breen, IV ............ H01R 4/4821 439/729
2018/0301823 A1 10/2018 Riku
2020/0350729 A1* 11/2020 Mastel ................. H01R 13/629

FOREIGN PATENT DOCUMENTS

DE 4210020 A1 9/1993
DE 102015113734 A1 2/2017
DE 102015107853 A1 7/2018

* cited by examiner

*Primary Examiner* — Tulsidas C Patel
*Assistant Examiner* — Thaslimur Rahman
(74) *Attorney, Agent, or Firm* — Muncy, Geissler, Olds & Lowe, P.C.

(57) ABSTRACT

A single-pole or multipole plug connector includes an insulating housing and a contact insert having a conductor receptacle. The insulating housing has a conductor insertion guide channel for guiding the electrical conductor to the conductor receptacle and a contact pin insertion guide channel for guiding the contact pin to the contact pin connection. The conductor insertion guide channel and the contact pin insertion guide channel being oriented so as to run at an angle to each other. A cover housing part is arranged on the main housing part such that the conductor insertion guide channel runs in parallel to a mounting direction of the contact insert and the contact pin insertion guide channel perpendicularly thereto. The mounting direction of the contact insert being predefined by a mounting opening of the main housing part which may be closed with the cover housing part.

15 Claims, 6 Drawing Sheets

PLUG CONNECTOR AND INSULATING HOUSING FOR A PLUG CONNECTOR

This nonprovisional application claims priority under 35 U.S.C. § 119(a) to German Patent Application No. 20 2022 105 275.1, which was filed in Germany on Sep. 19, 2022, and which is herein incorporated by reference.

BACKGROUND OF THE INVENTION

Field of the Invention

The invention relates to a single-pole or multipole plug connector, which includes an insulating housing and a contact insert having a conductor receptacle for connecting an electrical conductor and a contact pin connector. The invention furthermore relates to an insulating housing for a plug connector of this type.

Description of the Background Art

Plug connectors are known from electrical connecting systems. Plug connectors are used as electromechanical connecting components for connecting flexible and rigid electrical conductors to establish an electrical connection. The plug connectors may have, for example, spring-force clamping connections, in which the electrical conductors are clamped against an electrically conductive contact piece with the aid of the spring force of a clamping spring. The joint arrangement of the contact piece and clamping spring against each other is referred to in the present case as a contact insert.

The contact insert has a conductor receptacle for connecting an electrical conductor, for example a flexible electrical conductor. This means that the electrical conductor present, for example as a stripped conductor wire, may be inserted into an area of the contact insert so that the electrical conductor contacts the contact piece, and an electrical connection of the conductor may be established, the clamping spring fixing the electrical conductor on the contact piece and hereby securing and improving the electrical connection. The contact piece is also referred to in practice as a busbar or contact bar or power rail. The contact piece is a largely rigid electrical conductor and may be, for example, a metal strip, which may also for example, be bent in sections to form a receptacle or an insertion section for electrical conductors or a contact section. The contact insert also has a contact pin connection.

The insulating housing receives the contact insert. An insulating housing is a housing made from an insulating, electrically non-conductive material, for example plastic. The insulating housing has a conductor insertion guide channel for guiding the electrical conductor to the conductor receptacle and a contact pin insertion guide channel for guiding a contact pin to the contact pin connection. The conductor insertion guide channel and the contact pin insertion guide channel are oriented at an angle to each other.

Due to the angled profile of the conductor insertion guidance and contact pin insertion guidance with respect to each other, with a corresponding arrangement of the conductor receptacle and contact pin connection on the contact insert, the mounting of the contact insert into the insulating housing is not trivial. The insulating housing is usually divided into two housing halves in a plane spanned by the conductor insertion direction and the contact pin insertion direction or in a plane running in parallel hereto, and the contact insert is inserted into one housing half transversely to the conductor insertion direction and transversely to the contact pin insertion direction and closed by the other housing half. However, the housing halves must be manufactured with a high dimensional stability to be able to be properly and securely closed, and the contact insert must be purposefully placed in a precisely fitting manner in the area in the housing half provided for this purpose. In the case of multipole plug connectors having multiple contact inserts, the mounting possibilities according to the procedure customary in practice are limited or extremely complex.

SUMMARY OF THE INVENTION

It is therefore an object of the invention to provide a plug connector and an insulating housing for a plug connector, which permit an easier and more economical mounted of the plug connector.

The insulating housing can have a main housing part and a cover housing part and is therefore designed with at least two parts. According to the invention, it is provided that the cover housing part is arranged on the main housing part in such a way that the conductor insertion guide channel runs predominantly in parallel to a mounting direction of the contact insert, and the contact pin insertion guide channel runs predominately perpendicularly thereto, the mounting direction of the contact insert being predefined by a mounting opening which may be closed with the aid of the cover housing part.

The mounting of the plug connector may be simplified hereby. The insulating housing is divided in a different parting plane than is known in the conventional art. The insulating housing is not divided in a plane spanned by the conductor insertion direction and the contact pin insertion direction or in a plane running in parallel hereto, but rather in a plane situated perpendicularly to the plane spanned by the conductor insertion direction and the contact pin insertion direction. In simplified terms, the contact insert is not inserted laterally into the insulating housing during the mounting of the plug connector, but rather is pushed into the insulating housing from the rear side. The mounting opening used to insert the contact insert, which defines or predefines the mounting direction of the contact insert, is dimensioned to be smaller than a mounting opening for a division of the insulating housing in the plane spanned by the conductor insertion direction and contact pin insertion direction. A better dimensional stability may be maintained hereby during the manufacturing of the insulating housing. In addition, a defined and intuitive insertion operation is made possible for mounting the plug connector. Moreover, a more compact design of the plug connector is achieved.

The contact insert may be inserted into the main housing part. In the interior of the main housing part, a conductor connecting space for the electrical conductor to be connected is formed by the conductor receptacle of the contact insert, and a contact pin connecting space for the contact pin to be connected is formed by the contact pin connection of the contact insert. The cover housing part forms a closure of the insulating housing and covers the contact insert inserted into the main housing part as well as the conductor connecting space and/or the contact pin connecting space. Further functional elements of the plug connector may be arranged on the main housing part, for example an actuating element or a test opening. The cover housing part is preferably detachably connectable or connected to the main housing part. An inspection, maintenance, or replacement of the contact insert may be made possible hereby even after the cover housing part has been placed on the main housing part. For example, plug, screw, or latching connections may be considered as detachable connections.

A parting plane between the main housing part and the cover housing part may run, for example, in parallel to an insertion direction of a contact pin into the contact pin connection, which is formed for connecting a contact pin, or in parallel to an extension direction of a contact pin of the contact pin connection, which is designed to connect the contact pin to a contact pin receptacle (e.g., socket). The parting plane may run, for example, perpendicularly to an insertion direction of an electrical conductor into the conductor receptacle.

A mounting direction of the contact insert predefined by a mounting opening can be understood to be an insertion direction of the contact insert into the insulating housing, the contact insert preferably being insertable into the insulating housing only through the mounting opening. The mounting opening defines the mounting direction. The contact insert is preferably insertable into the insulating housing only in a certain orientation through the mounting opening, so that an incorrect mounting may be ruled out. The mounting opening may have, for example, a corresponding dimensioning, geometric shape, or a coding. The cover housing part is configured to close the mounting opening, i.e., it covers the latter at least partially or completely when the cover housing part is mounted on the main housing part. The mounting opening furthermore defines the parting plane between the main housing part and the cover housing part.

The conductor insertion guide channel runs predominantly in parallel to the mounting direction. This means that a longitudinal extension, which may be, for example, the longest main extension direction of the conductor insertion guide channel, or an imaginary central longitudinal axis of the, for example, cylindrical or conical conductor insertion guide channel, runs in a spatial direction which corresponds to the mounting direction or runs in parallel hereto. The contact pin insertion guide channel runs predominantly perpendicularly to the mounting direction. This means that a longitudinal extension, which may be, for example, the longest main extension direction of the contact pin insertion guide channel, or an imaginary central longitudinal axis of the, for example, cylindrical or conical contact pin insertion guide channel, runs in a spatial direction which is perpendicular to a spatial direction of the mounting direction. In this connection, the limitation of "predominantly" includes slight angle deviations, for example up to 3%, 5%, or up to 10% from an exact parallelism or orthogonality.

The mounting direction may run predominantly diametrically opposed to a conductor insertion direction of an electrical conductor inserted into the conductor insertion guide channel.

A single-pole or multipole plug connector may be a plug connector having one contact insert or multiple contact inserts, for example one contact insert for each pole. The plug connector may thus also be configured for a multiple connection of multiple electrical conductors and contact pins.

The conductor insertion guide channel and the contact pin insertion channel are oriented at an angle to each other. The angle may be, for example, essentially 90°. In principle, other angles of the orientation to each other are also conceivable, for example, angles between 45° and 135°.

The conductor insertion guide channel may run toward the cover housing part. The cover housing part may thus be arranged on the main housing part in such a way that a conductor insertion guide channel running on the main housing part faces the cover housing part. A conductor inserted into the conductor insertion guide channel and the conductor receptacle is thus guided to the cover housing part when introduced.

The cover housing part may have a main extension plane, which is spanned by the width and length of the cover housing part, the width and length of the cover housing part being greater than the depth of the cover housing part. The contact pin insertion guide channel of the plug connector may run predominantly in parallel to the main extension plane of the cover housing part when the cover housing part is arranged on the main housing part.

The conductor insertion guide channel and/or the contact pin insertion guide channel may be arranged completely within the main housing part. In this sense, the conductor insertion guide channel and/or the contact pin insertion guide channel is/are formed with a closed cross section in the main housing part. In this example, the channel cross section is not formed partially by the main housing part and the cover housing part or intersected by the parting plane or mounting opening in each case. An easier manufacturing of the insulating housing as well as a more stable guidance and receiving of the electrical conductor and/or contact pin may be permitted hereby. However, in other examples, it is in principle also conceivable, for example, to form the contact pin insertion guide channel partially by the main housing part and partially by the cover housing part.

The main housing part and/or the cover housing part may have at least one cover latching element for fastening the cover housing part on the main housing part. Multiple cover latching elements may also be provided on the main housing part and/or the cover housing part. The cover latching element may be, for example, a latching nib, a latching tab, or a latching hook on the one housing part and engage behind a latching edge on the other housing part or engage with a latching opening on the other housing part. The latching edge or latching opening may be referred to, for example, as a mating latching element. In connection with the mating latching element, the cover latching element ensures a force-fitting and form-fitting fixing of the cover housing part on the main housing part. The cover housing part may, for example, be fitted or slid onto the main housing part or subsequently be fixed thereon with the aid of the cover latching element. An easy and tool-free mounting of the cover housing part on the main housing part may be implemented with the aid of a cover latching element which permits a latching connection between the cover housing part and the main housing part.

The main housing part may have a seating web for the contact insert. The seating web may be designed as a bar-like material projection formed as a single piece in the main housing part and extend, for example, in the mounting direction or predominantly in parallel thereto. For example, the contact insert may be supported on the seating web via the contact piece, for example via a conductor seating section of the conductor receptacle, and/or via the contact pin connection. The seating web enables the contact insert to be guided when it is inserted into the insulating housing, so that the mounting is made easier. In addition, a more favorable force absorption of the contact forces arising during the operation of the plug connector is made possible, since the support of the contact insert via the seating web takes place close to the conductor receptacle.

At least one cover latching element may be arranged on the seating web. For example, the seating web may have a latching hook on its end facing the mounting opening or the cover housing part, which may engage with a latching opening of the cover housing part for fixing the cover housing part on the main housing part. The seating web may be elastically deflectable, so that the latching connection may be easily released. By arranging a cover latching element on the seating web, the seating web performs a multiple function, which comprises supporting the contact insert, guiding the contact insert during mounting, and providing a latching element for fixing the cover housing part. The seating web, including the cover latching element, may also be largely arranged in the center of the plug connector and thus facilitate a favorable stable fastening of the cover housing part.

The main housing part and/or the cover housing part may have a partition element. The partition element may be a predominantly planar partition wall for electrically insulating side-by-side contact inserts in multipole plug connectors. The partition element may be designed to form a single piece with the main housing part or cover housing part. A reliable insulation within the housing is established by means of the partition element, and the mounting of multipole plug connectors is simplified by the integral formation of the partition element with the main or cover housing part.

A seating web may be provided on the main housing part for each pole of the plug connector. Alternatively, or additionally, at least one partition element may be provided on the main housing part and/or the cover housing part for each pole of the plug connector. A separate seating web and/or a separate partition element may be provided hereby for each contact insert of the plug connector, so that the fixing of the cover housing part on the main housing part is further optimized, and the insulation of the contact inserts from each other is further improved. However, it is also conceivable that fewer partition elements than poles are provided, since two contact inserts may be insulated from each other by a shared partition element within a plug connector.

The contact pin connection may be designed to connect a contact pin. This means that a contact pin—generally a rigid electrical conductor—may be inserted into an area of the contact insert, so that the contact pin may contact the contact piece, and an electrical connection of the contact pin may be established.

The contact pin connection of the contact insert may be designed for this purpose as a contact fork having contact fork arms. A contact pin receptacle is thus provided as a mating contact for receiving a contact pin. The contact fork arms may be elastically deflectable. An easy and secure fixing as well as a good electrical contacting of a contact pin inserted into the contact pin receptacle may be achieved with the aid of a contact fork. The contact fork may have a fork base, from which the contact fork arms protrude such that they run toward each other. If the main housing part has a seating web, the contact pin connection may be supported on the seating web via the fork base, the contact fork arms each being guided past one side of the seating web. A compact plug connector having a favorable force distribution of the contact forces is provided hereby.

However, it is also conceivable that a contact pin is arranged on the contact pin connection, and a socket or contact pin receptacle is connected to the contact pin connection as a mating piece. The contact pin formed on the contact pin connection may be formed from two halves connected to a shared base section, for example as a two-part contact pin, or be connected only on one side of the base section.

The contact insert may include a clamping spring. A spring-force clamping connection for connecting an electrical conductor to a conductor seating section of the contact piece may be made possible with the aid of the clamping spring and a contact piece, which jointly arranged next to each other form the contact piece. An easy and secure fixing as well as a sufficient electrical contacting of the electrical conductor are made possible hereby. The clamping spring may have a contact leg for contact with the insulating housing and a clamping leg for clamping the conductor to the contact piece. The spring-force clamping connection may be lever-actuated. In a lever-actuated example, the insulating housing has a corresponding receptacle for an actuating lever. In this example, the plug connector may have one or multiple contact inserts, an insulating housing, and one or multiple actuating levers.

The contact insert may have a contact piece designed as a single part. The conductor receptacle and the contact pin connection are formed by the same contact piece. The contact piece may also have a spring receptacle for a clamping spring. The one-piece contact piece may be manufactured, for example, by stamping and bending a planar cut sheet section, the conductor receptacle, the contact pin connection, and/or the spring receptacle being able to be formed by bent sections of the cut sheet section. A contact insert of this type is easy to manufacture and offers a stable self-retention within the insulating housing.

The insulating housing may be or be able to be assembled in a modular manner. For example, equivalent main housing modules may be assembled according to a desired number of poles and be connectable to a shared cover housing part. Depending on the number of poles, differently dimensioned cover housing parts may be provided for this purpose. The main housing modules may have module latching elements for latching the main housing modules to each other. The main housing modules may additionally have cover latching elements for latching the shared cover housing part to the main housing modules. A flexible adaptation of the plug connector to predefined customer requirements may take place as needed with the aid of an insulating housing which may be assembled in a modular manner.

The invention also relates to an insulating housing, which includes a main housing part and a cover housing part, for a plug connector according to at least one of the features described above.

The disclosure of the invention also comprises a method for mounting a plug connector, including the steps: providing one or multiple contact inserts as well as an insulating housing, which includes a main housing part and a cover housing part, the insulating housing having a conductor insertion guide channel for guiding the electrical conductor to the conductor receptacle and a contact pin insertion guide channel for guiding the contact pin to the contact pin connection, the conductor insertion guide channel and the contact pin insertion guide channel being oriented such that they run at an angle to each other; inserting the contact insert or the contact inserts into the main housing part through a mounting opening of the main housing part in a mounting direction, which runs predominantly in parallel to the conductor insertion guide channel and predominantly perpendicularly to the contact pin insertion guide channel of the main housing part; and/or closing the mounting opening of the main housing part by placing the cover housing part on the main housing part.

The plug connector, the contact insert, and the insulating housing may preferably be designed according to the features described above in connection with the plug connector.

The advantages of an easier and economical mounting of the plug connector according to the invention are also achieved by the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
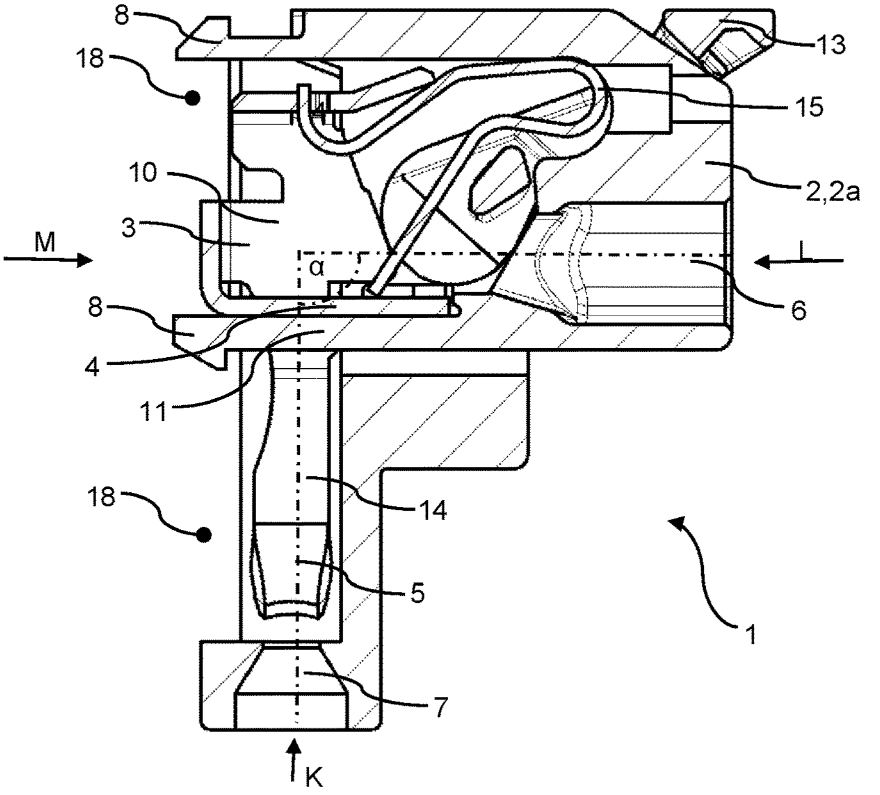
FIG. 1 schematically shows a cutaway side view of a plug connector according to an example, including a contact insert, which is inserted into a main housing part of the plug connector.
Figure 2:
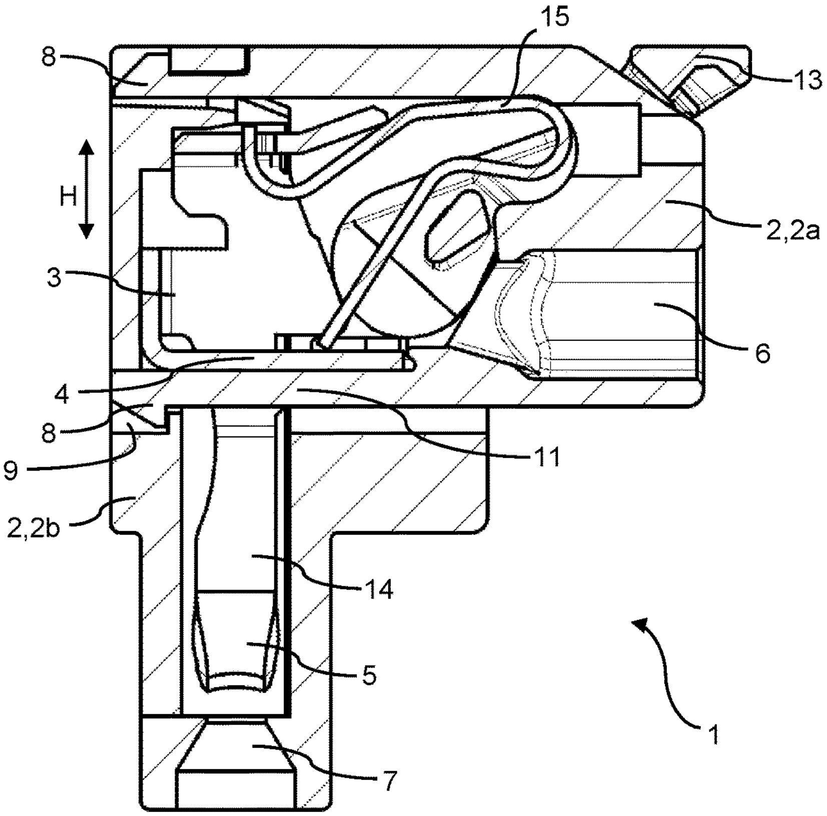
FIG. 2 schematically shows a cutaway side view of the plug connector according to FIG. 1, including a cover housing part placed on the main housing part.
Figure 11:
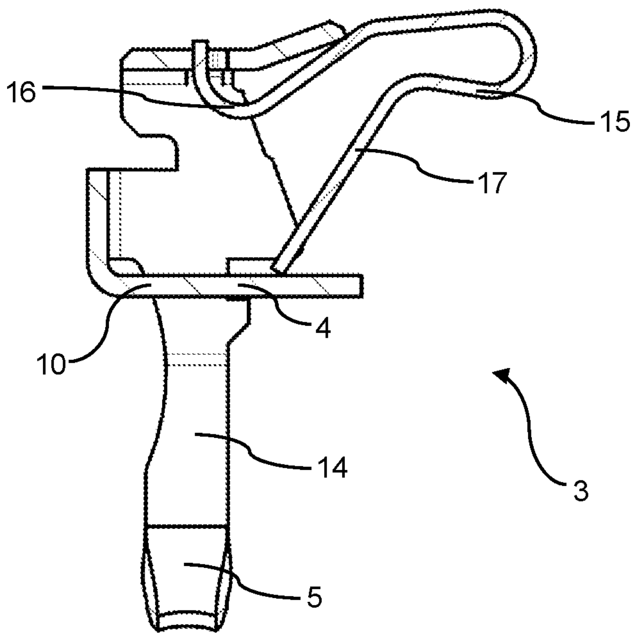
FIG. 11 schematically shows a cutaway side view of a contact insert for a plug connector.

FIGS. 1 and 2 show a plug connector 1 according to a first example, including an insulating housing 2, into which a contact insert 3 is inserted. Contact insert 3 has a contact piece 10, designed as a single piece, which is manufactured from a planar cut sheet section by stamping and bending and is provided as a power rail of plug connector 1. Contact insert 3 also has a clamping spring 15, which is suspended in contact piece 10 and, as illustrated in FIG. 11, has a contact leg 16 for contacting contact piece 10 and insulating housing 2 as well as a clamping leg 17 for clamping an electrical conductor to contact piece 10. Contact insert 3 forms a conductor receptacle 4 at the provided connecting point of the electrical conductor. In addition, contact insert 3 forms a contact pin connection 5 with the aid of contact piece 10, in that two elastically deflectable contact fork arms 14 integrally formed with contact piece 10 protrude from contact piece 10, starting at a fork base, which form a contact fork for a contact pin to be plugged in.

As is apparent on the basis of FIGS. 1 and 2, insulating housing 2 has a main housing part 2*a* and a cover housing part 2*b*. Contact insert 3 is inserted into main housing part 2*a*. Main housing part 2*a* is closed with cover housing part 2*b*, so that insulating housing 2 encloses contact insert 3 when cover housing part 2*b* is arranged on main housing part 2*a*.

Insulating housing 2, main housing part 2*a* in the illustrated example, has a conductor insertion guide channel 6 for guiding to conductor receptacle 4 a conductor to be connected. The conductor is thus guided through a conductor insertion opening and through conductor insertion guide channel 6 to conductor 4, where it is clamped to contact piece 10 with the aid of clamping leg 17 of clamping spring 15. Insulating housing 2, main housing part 2*a* in the illustrated example, has a contact pin insertion guide channel 7 for guiding to contact pin connection 5 a contact pin to be connected. The contact pin is thus conducted through a contact pin insertion opening and through contact pin insertion guide channel 7 to contact pin connection 5, where it is clamped to contact piece 10 with the aid of contact fork arms 14 of contact piece 10. Conductor insertion guide channel 6 and contact pin insertion guide channel 7 run at an angle α to each other, i.e., their central longitudinal axes are at an angle α to each other. In the illustrated example, angle α is approximately 90°; conductor insertion guide channel 6 and contact pin insertion guide channel 7 run predominantly perpendicularly to each other. In the illustrated example, conductor insertion guide channel 6 and contact pin insertion guide channel 7 are arranged completely in main housing part 2*a*. As is apparent in FIGS. 1 and 2, cover housing part 2*b* is arranged above contact pin insertion guide channel 7 in such a way that cover housing part 2*b* does not form a subsection of contact pin insertion guide channel 7. Only a contact pin connection space adjacent to contact pin insertion guide channel 7, in which contact pin connection 5, including contact fork arms 14, is arranged, is closed by cover housing part 2*b*.

On its side facing away from the conductor insertion opening, main housing part 2*a* has a mounting opening 18, through which contact insert 3 may be inserted into main housing part 2*a* in a mounting direction M. Mounting opening 18 is closed by cover housing part 2*b* by placing cover housing part 2*b* on top. Mounting direction M runs predominantly in parallel to a longitudinal extension direction of conductor insertion guide channel 6 and is diametrically opposed to a conductor insertion direction L. Conductor insertion direction L and mounting direction M are situated predominantly perpendicularly to a contact pin insertion direction K. Contact pin insertion guide channel 7 runs predominantly perpendicularly to mounting direction M of contact insert 3. Mounting direction M of contact insert 3 into main housing part 2*a* is predefined by mounting opening 18. Conductor insertion guide channel 6 converges on cover housing part 2*b* when the latter is fastened on main housing part 2*a*, as illustrated in FIG. 2.

As indicated by an arrow representation in FIG. 2, cover housing part 2*b* has a main extension plane H, which extends predominantly in parallel to contact pin insertion guide channel 7 or contact pin insertion direction K. Main extension plane H of cover housing part 2*b* is spanned by its length and width extensions, which are each greater than the depth extension of cover housing part 2*b*. A conductor insertion direction L may run predominantly perpendicularly to main extension plane H.

Main housing part 2*a* has a seating web 11, on which contact piece 10 is supported and, for this purpose, rests on seating web 11 with a seating area. Contact fork arms 14 are guided past seating web 11 and each project in the direction of contact pin insertion guide channel 7 on one side of seating web 11. Seating web 11 extends below conductor receptacle 4 in the direction of cover housing part 2*b* and protrudes into mounting opening 18. In the area of mounting opening 18 of main housing part 2*a*, seating web 11 has a cover latching element 8 designed as a latching hook and configured to engage with a latching opening 9 of cover housing part 2*b* for the purpose of latching cover housing part 2*b* on main housing part 2*a*. In addition, a further cover latching element 8, also designed as a latching hook, is provided on main housing part 2*a* on a side of contact insert 3 opposite seating web 11 for the purpose of further optimizing the fastening of cover housing part 2*b* on main housing part 2*b*. Plug connector 1 also has an actuating lever 13 for actuating the spring-force clamping connection by displacing clamping leg 17 of clamping spring 15.

Figure 3:
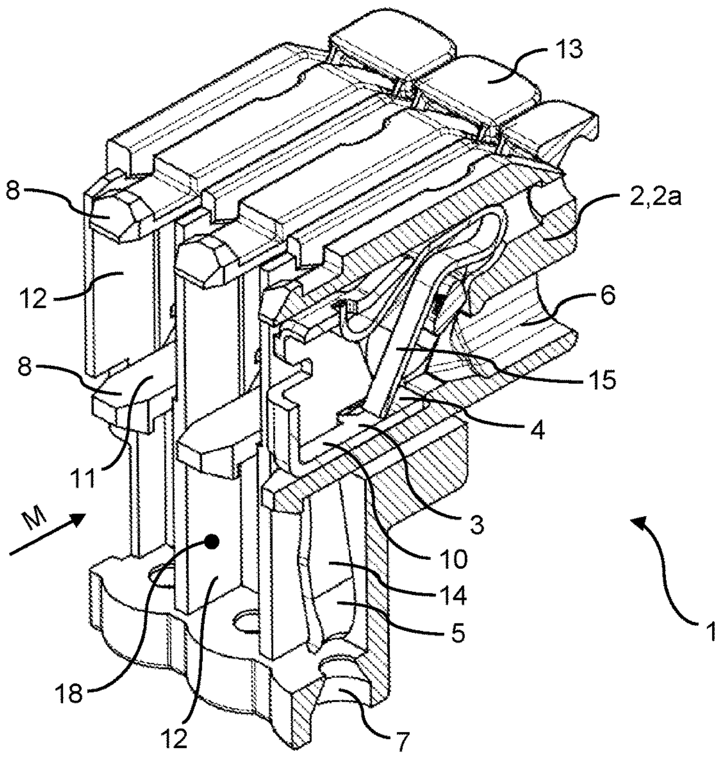
FIG. 3 schematically shows a perspective cutaway view of a plug connector according to an example without a cover housing part.
Figure 4:
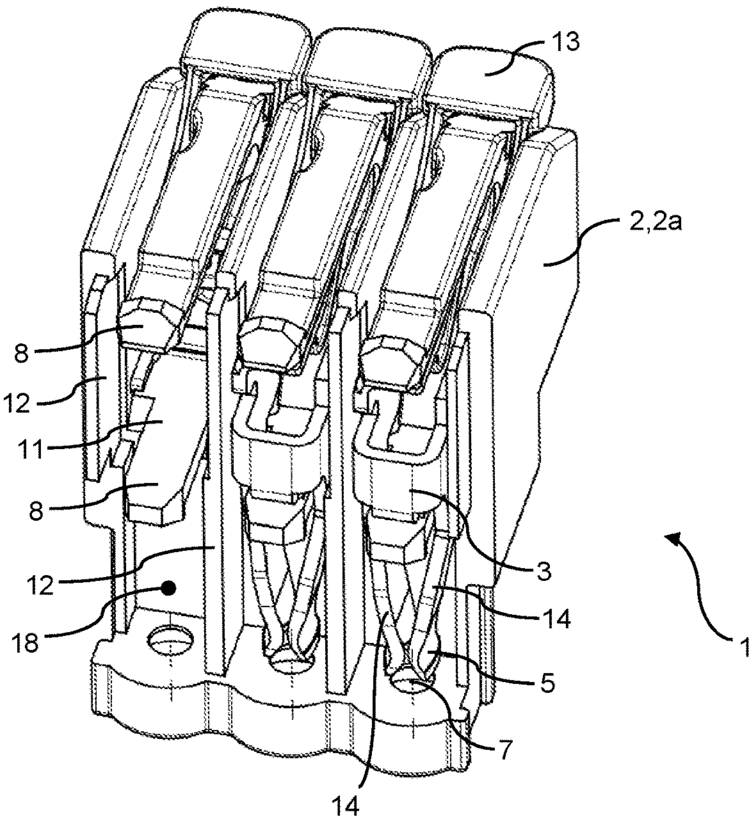
FIG. 4 schematically shows a perspective rear view of the plug connector according to the example without a cover housing part.
Figure 5:
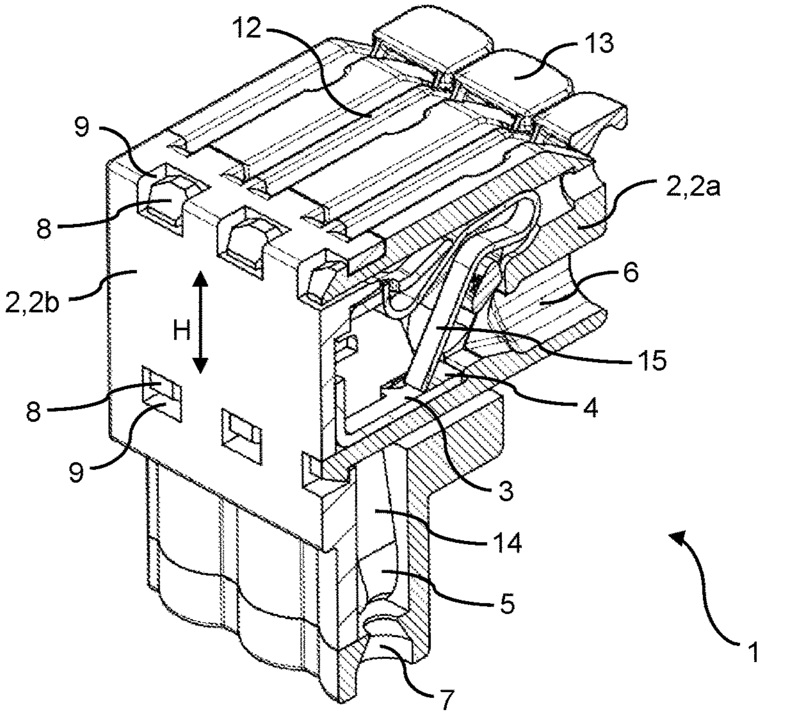
FIG. 5 schematically shows a perspective cutaway side view of the plug connector according to the example with the cover housing part placed on top.

FIGS. 3 through 8 show a plug connector 1 according to a further example. Plug connector 1 is provided with a multipole design and has multiple contact inserts 3, specifically three according to the example. In FIGS. 3 and 5, plug connector 1 is shown in a cutaway view in the area of third contact insert 3. To better understand the figures, only one contact insert 3 is shown in FIG. 3 and only two contact inserts 3 are shown in FIG. 4, inserted into insulating housing 2. Insulating housing 2 has a main housing part 2*a*, into which multiple contact inserts 3 are inserted, and a cover housing part 2*b* for fastening to main housing part 2*a*. Main housing part 2*a* has a mounting opening 18, by means of which a mounting direction M of contact inserts 3 in insulating housing 2 is predefined. Main housing part 2*a* has partition elements 12 designed as planar partition walls, which separate and insulate contact inserts 3 from each other. An extension plane of partition elements 12, which is defined by their length and width extensions, which are greater than the depth extension of partition elements 12, runs predominantly perpendicularly to mounting direction M and predominantly in parallel to a contact pin insertion direction K.

As in plug connector 1 according to the first example, contact insert 3 in plug connector 1 according to the second example has a contact piece 10 with a conductor receptacle 4 and a contact pin connection 5, contact pin connection 5 being formed by a contact fork having contact fork arms 14. It is clear in FIG. 4 that contact fork arms 14 are each guided past one side of seating web 11 and are supported on seating web 11 by a fork base. Main housing part 2*a* has one conductor insertion guide channel 6 and one contact pin insertion guide channel 7 for each contact insert 3. A supporting web 11 having a cover latching element 8 as well as a further cover latching element 8 is provided for each contact insert 3 on an end of main housing part 2*a* opposite contact pin insertion guide channel 7. An actuating lever 13 for actuating the spring-force clamping connection of contact inserts 3 is provided for each contact insert 3.

Figure 6:
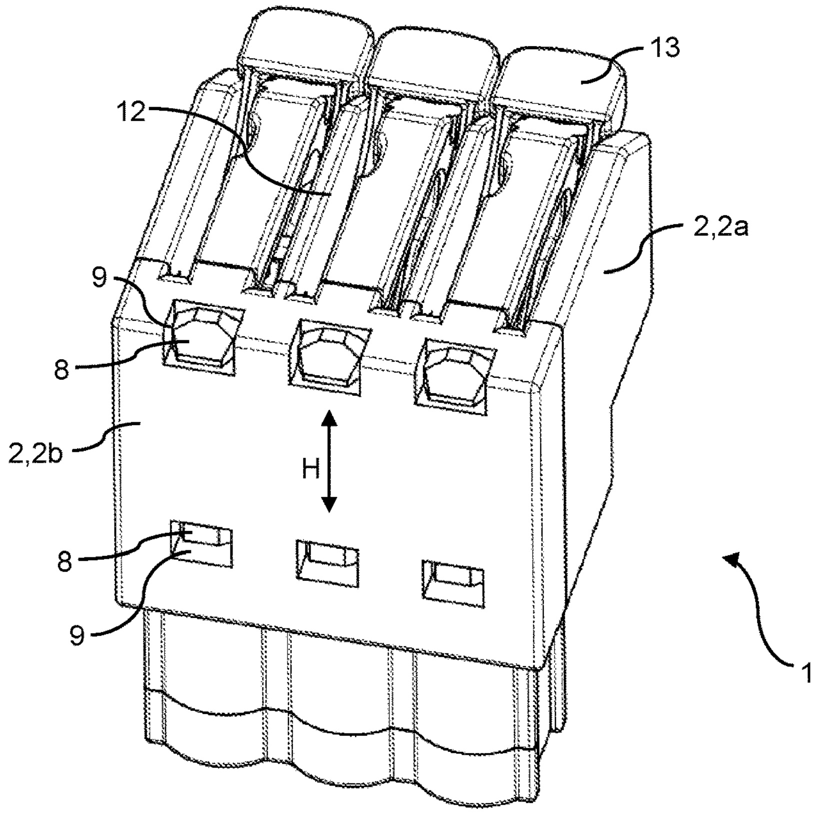
FIG. 6 schematically shows a perspective rear view of the plug connector according to an example with the cover housing part placed on top.

Plug connector 1 according to the second example, with the cover housing part 2 planed on top, is apparent in FIGS. 5 and 6. Cover housing part 2*b* has a main extension plane H. Main extension plane H of cover housing part 2*b* is spanned by its length and width extensions, which are each greater than the depth extension of cover housing part 2*b*. Cover housing part 2*b* has two latching openings 9 for each contact insert 3, with which cover latching elements 8 of main housing part 2*b* may engage.

Figure 7:
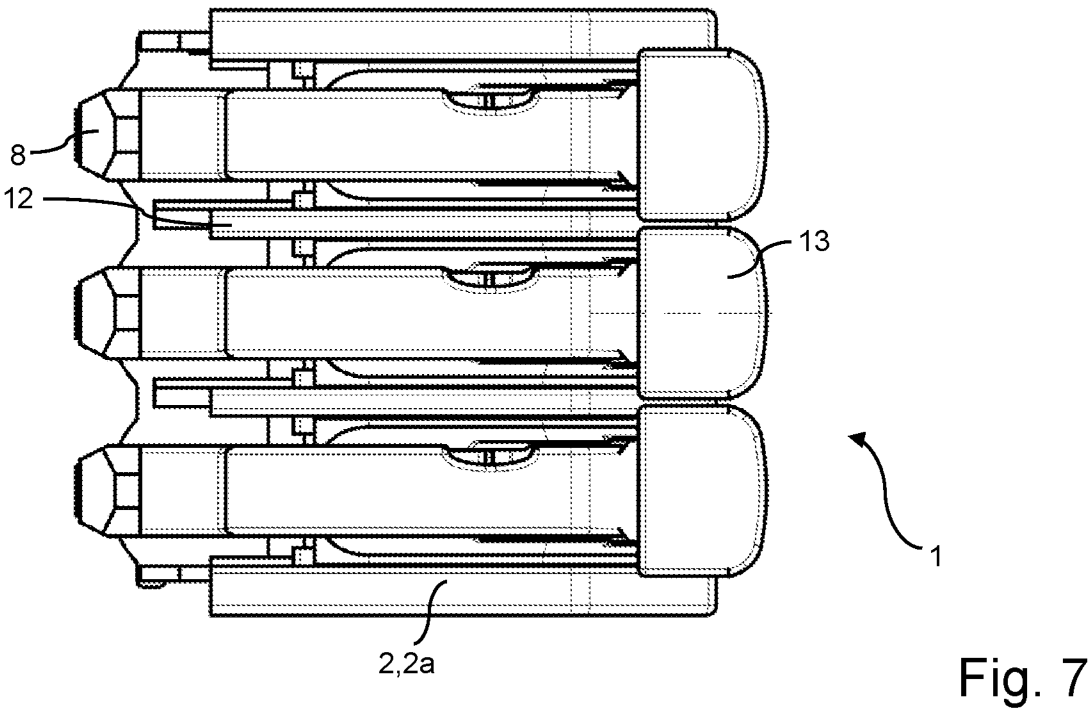
FIG. 7 schematically shows a top view of the plug connector according to the example without a cover housing part.
Figure 8:
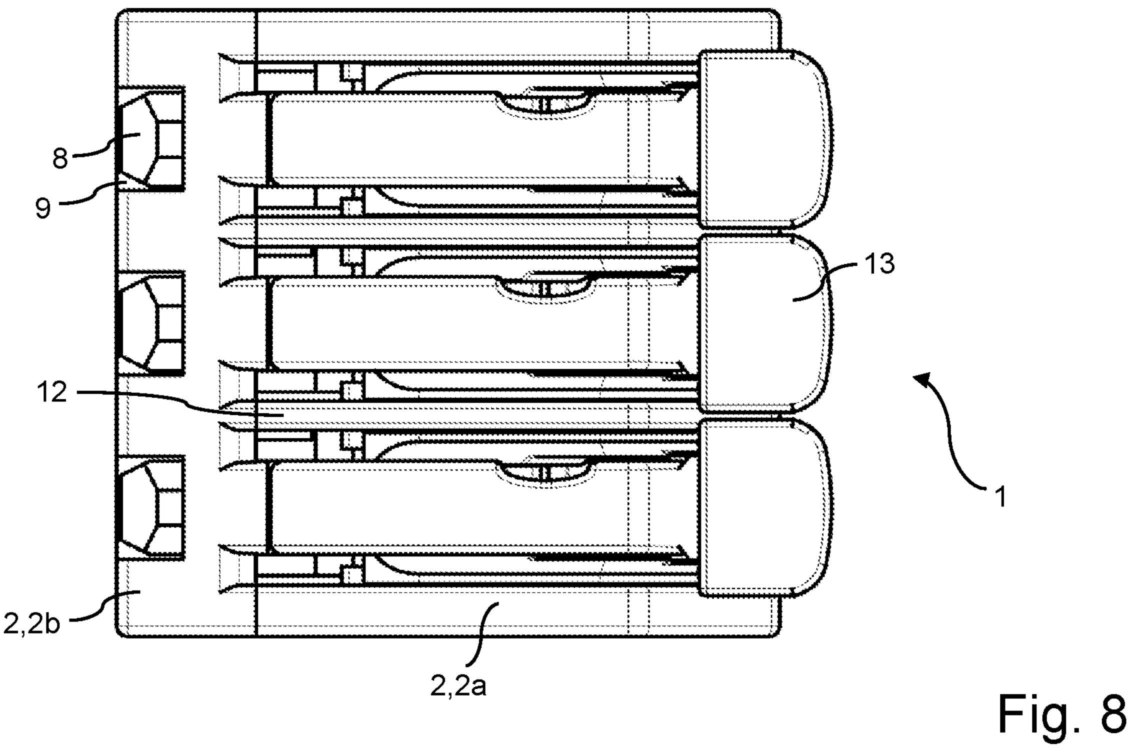
FIG. 8 schematically shows a top view of the plug connector according to the example with the cover housing part placed on top.
Figure 9:
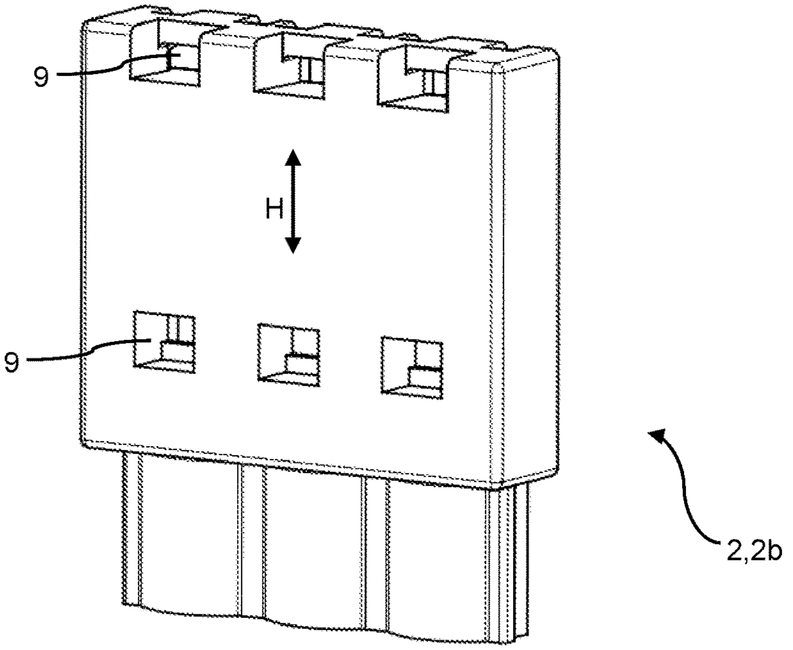
FIG. 9 schematically shows perspective front view of a cover housing part for the plug connector.
Figure 10:
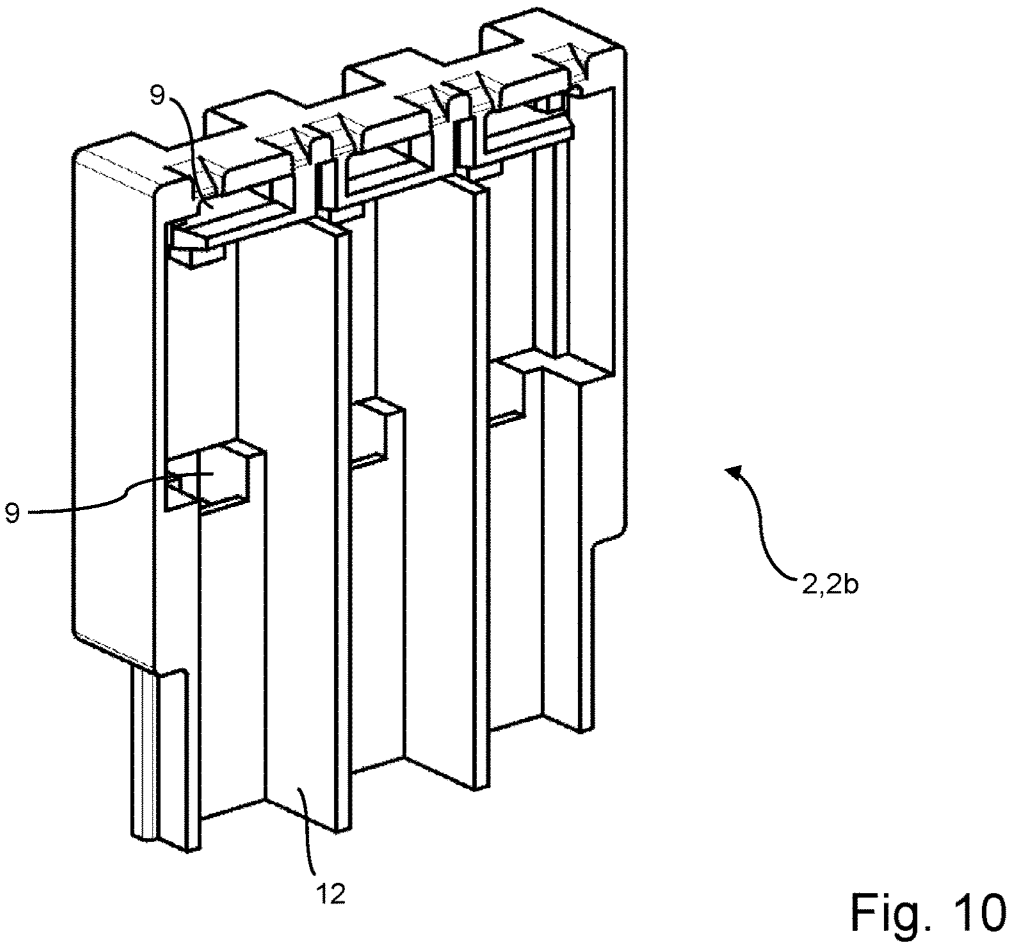
FIG. 10 schematically shows perspective rear view of a cover housing part for the plug connector.

Plug connector 1 according to the second example without cover housing part 2 and with cover housing part 2*b* placed on top, is apparent in FIGS. 7 and 8. It is clear that cover housing part 2*b* forms a closure of main housing part 2*a* for the purpose of forming an insulating housing 2 encompassing contact inserts 3. In addition, cover housing part 2*b* is shown in an isolated manner in FIGS. 9 and 10 in a front and rear view, so that the structure of cover housing part 2*b* is made clear. It is apparent that, in the illustrated example, cover housing part 2*b* also has partition elements 12, which adjoin partition elements 12 of main housing part 2*a* during a mounting of cover housing part 2*b* on main housing part 2*a* and thus improve the insulation of contact inserts 3.

Contact insert 3 is additionally shown without an insulating housing 2 in FIG. 11 to improve the understanding of the invention. The one-piece compact form of contact piece 10 is clear, including suspended clamping spring 15, bent conductor receptacle 4, and the also integrally shaped contact fork arms 14 of contact piece 10. Illustrated contact insert 3 is a self-supporting contact insert 3, in which the contact force applied during the clamping of an electrical conductor is conducted predominantly into contact insert 3 instead of into surrounding insulating housing 2.

Based on the figures, it is clear that the mounting of plug connector 1 according to the invention is greatly simplified over comparable plug connector solutions, in which contact insert 3 is inserted from the side, according to the prior art. A highly compact plug connector 1 may also be provided, due to the changed mounting situation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A single-pole or multipole plug connector comprising:

a contact insert having a conductor receptacle to connect an electrical conductor and a contact pin connection;

an insulating housing having a conductor insertion guide channel for guiding the electrical conductor to the conductor receptacle and a contact pin insertion guide channel for guiding the contact pin to the contact pin connection, the conductor insertion guide channel and the contact pin insertion guide channel being oriented so as to run at an angle to each other, the insulating housing having a main housing part and a cover housing part, the cover housing part being arranged on the main housing part such that the conductor insertion guide channel runs substantially in parallel to a mounting direction of the contact insert and the contact pin insertion guide channel runs substantially perpendicularly thereto, the mounting direction of the contact insert being predefined by a mounting opening of the main housing part that is adapted to be closed via the cover housing part.

2. The plug connector according to claim 1, wherein the conductor insertion guide channel runs toward the cover housing part.

3. The plug connector according to claim 1, wherein the contact pin insertion guide channel runs substantially in parallel to a main extension plane of the cover housing part.

4. The plug connector according to claim 1, wherein the conductor insertion guide channel and/or the contact pin insertion guide channel is/are arranged completely within the main housing part.

5. The plug connector according to claim 1, wherein the main housing part and/or the cover housing part have at least one cover latching element to fasten the cover housing part on the main housing part.

6. The plug connector according to claim 1, wherein the main housing part has a seating web for the contact insert.

7. The plug connector according to claim 5, wherein at least one cover latching element is arranged on the seating web.

8. The plug connector according to claim 1, wherein the main housing part and/or the cover housing part has a partition element.

9. The plug connector according to claim 6, wherein a seating web is provided on the main housing part and/or at least one partition element is provided on the main housing part or the cover housing part for each pole of the plug connector.

10. The plug connector according to claim 1, wherein the contact pin connection is designed as a contact pin having one or two contact pin arms protruding from a base section or as a contact pin receptacle having two contact pin receiving arms which protrude from the base section.

11. The plug connector according to claim 1, wherein the contact pin connection of the contact insert is a contact fork having contact fork arms.

12. The plug connector according to claim 1, wherein the contact insert has a clamping spring.

13. The plug connector according to claim 1, wherein the contact insert has a contact piece designed as a single piece.

14. The plug connector according to claim 1, wherein the insulating housing is assembled in a modular manner.

15. An insulating housing comprising a main housing part and a cover housing part for the plug connector according to claim 1.

* * * * *